United States Patent [19]

Starr

[11] Patent Number: 5,067,984

[45] Date of Patent: Nov. 26, 1991

[54] OIL ABSORBENT

[76] Inventor: Tina F. Starr, General Delivery, Salmo, British Columbia, V0G 1Z0, Canada

[21] Appl. No.: 458,562

[22] Filed: Dec. 19, 1989

[51] Int. Cl.$^5$ .......................... B08B 7/00; B01J 20/24
[52] U.S. Cl. ........................ 134/7; 210/680; 210/693; 502/401; 502/404
[58] Field of Search .............. 134/7; 210/680, 693; 502/401, 404

[56] References Cited

U.S. PATENT DOCUMENTS

| | | | |
|---|---|---|---|
| 3,676,357 | 7/1972 | Ciuti et al. | 210/680 |
| 3,791,990 | 2/1974 | Fischer | 502/404 |
| 4,066,539 | 1/1978 | Hachisu et al. | 210/680 |
| 4,240,800 | 12/1980 | Fischer | 502/404 |
| 4,483,716 | 11/1984 | Heller | 134/7 |

FOREIGN PATENT DOCUMENTS

| | | | |
|---|---|---|---|
| 3343965 | 12/1984 | Fed. Rep. of Germany | 502/404 |
| 0045595 | 4/1977 | Japan | 502/404 |
| 6105748 | 8/1981 | Japan | 502/404 |
| 0076538 | 5/1984 | Japan | 502/404 |

*Primary Examiner*—Asok Pal
*Attorney, Agent, or Firm*—Pierre Lespérance

[57] ABSTRACT

An oil degradation compound, comprising a mixture of a carrier, namely flour, a first oil-reactive agent, namely dry powdered mustard, and a second wetting agent, the carrier and first agent being each in a concentration which may vary from 1 to 99% by weight relative to the total amount of carrier and first agent. The wetting agent is in a small amount just sufficient to produce a paste when admixed with the first agent and carrier. The paste is destined to be spread onto an oil spill on a land surface, wherein the oil is to be absorbed by the paste and broken down into a crumbly powder, which can then be easily collected.

4 Claims, No Drawings

OIL ABSORBENT

FIELD OF THE INVENTION

This invention relates to the field of organic absorbants, absorbants for oil, oil dissolving substances and organic absorbant processes.

BACKGROUND OF THE INVENTION

Environmental concerns have become a major political issue in almost every region of the world. The citizens are now very sensitive to the quality of life and to the care taken in fauna and flora conservation. Indeed, full-fledged political parties now exist (e.g. the so-called "Green" party) with their main goal being to address the various problems of pollution.

One important aspect of the widespread pollution affecting nature today is the recurrent oil spills in oceans by oil tankers accidentally unloading their cargo following damage/puncturing of their hull. For instance, on Mar. 24, 1989, the oil tanker EXXON VALDEZ, after leaving its normal path on the waterway about the Prince William Bay on the Pacific coast of Alaska (U.S.A.) to clear an iceberg, ran aground on a coral reef, and its hull was damaged whereby oil began to leak. Of the 200,000 tons of oil from the tanker, 40,000 tons managed to escape and to spread on the water, to eventually reach more than one thousand kilometers of coastal land regions. The alaskan wildlife fauna and flora is fragile, partly because of the harsh weather, and therefore the tragic ecological consequences will be long-lasting. The Exxon corporation, owner of the tanker, was able to recover less than 10% of this oil spill, mainly on the water.

A much greater ecological disaster occurred on the coast region of France on Mar. 16, 1978 when the Amoco Cadiz, a liberian vessel, ran aground a few kilometers from the coast and hit rocks which punctured its hull. Up to 230,000 tons of the oil carried by the Amoco Cadiz were spread on the water and over 250 kilometers of French coastal land.

Technically, it is much easier to clean oil spills on the water surface than when it reaches land. Various means have been devised to degrade oil spills in water. For example, the landmark decision of the U.S. Supreme Court in 1980: Diamond v. Chakrabarty, 206 USPQ (1980), which held that microorganisms produced by genetic engineering are not excluded from patent protection, allowed patenting of a microorganism capable of degrading oil compounds, notably oil from an oil spill on water. However, it has always been very difficult to extract oil once it has reached a beach or other coastal regions.

OBJECTS OF THE INVENTION

A general object of the invention is to address the pollution problem discussed in the background of the invention.

The main object of the invention is to eliminate surface pollution on beaches or other land surfaces, comprising losses either of gazoline, oil or by-products thereof.

A corollary object of the invention is to substantially increase the ease with which oil-based surface pollution can be extracted from a land surface and collected for discharge thereof at a dump site.

DESCRIPTION OF THE INVENTION

A compound for the degradation of oil i.e. for extraction and absorption thereof. The compound comprises the following elements:

(a) a carrier, more particularly flour, preferably Wheat Flower all white;

(b) a oil-reacting agent, more particularly dry powdered mustard; and (c) a wetting agent, preferably water in such quantity as to produce a paste out of the flour and mustard.

The carrier and the mustard each represent between 70% and 90% and between 1% and 30% respectively by weight of the combination of these two elements. The carrier and the mustard powder are to be thoroughly mixed together, e.g. in large quantities preferably in a cement mixer. Then, a small amount of water is added to the mix, to produce a paste, or more particularly a slurry if a high water content is present.

The paste is destined to be spread onto an oil spill on an oil covered land surface, such as a beach. The oil will then be absorbed by the paste (and more particularly by the flour in the paste), and be broken down into crumbly parts under the action of the mustard. The paste and oil combination will be allowed to dry, so that the absorbed oil can be handled and collected e.g. with a shovel, a rake or a vacuum hose, in a dry manner. The paste and oil combination can then be transported to a dump site by a truck. Basically, the action of the dry mustard powder on the oil is deemed by the inventor to be a flameless burn.

Thus, the paste should be spread on the beach only when the skies are clear and the weather, dry.

The invention also consists in a method of cleaning beaches and other coastal land regions near lakes and oceans from oil pollution, in which is used a compound consisting of a mixture of a carrier, namely flour, a first oil-reactive agent, namely dry powdered mustard, and a second wetting agent, said method comprising the following steps:

(a) waiting for clear skies and dry weather;

(b) upon such weather conditions occurring, mixing said carrier and first agent in a thorough manner, to constitute a dry mixture;

(c) admixing the wetting agent with the dry mixture, to constitute a paste;

(d) spreading the paste onto the land surface polluted with oil, with a rake, a shovel or the like, whereby the oil is absorbed and broken down into a crumbly powder;

(e) collecting the crumbly powder with a rake, a vacuum hose or a shovel;

(f) loading the collected crumbly powder into a transport vehicle; and (g) driving the vehicle to a suitable dump site for unloading the crumbly powder therein.

It is to be understood that a waterless mixture of oil with the powdered mustard, produces a highly flammable compound. Thus, great care as to the nature and quality of packaging for the present product should be exercised.

I claim:

1. A petroleum or petroleum by-product degradation compound, consisting exclusively of a mixture limited to flour, dry powdered ground mustard, and a wetting agent, said wetting agent being in a small amount just sufficient to produce a paste when admixed with said ground mustard and flour; wherein said mustard is an oil-active surfactant agent; wherein said paste is destined to be spread onto an oil spill on a land surface, and wherein the oil is to be absorbed by the paste and broken down into a crumbly powder, which can then be easily collected.

2. A compound as defined in claim 1, wherein said wetting agent is water.

3. A compound as defined in claim 1, wherein there are between 70% and 80% in weight of the flour and between 20% and 30% in weight of the ground mustard powder, relative to the total amount of flour and ground mustard.

4. A method of cleaning beaches and other coastal land regions near lakes and oceans from oil pollution, in which is used a compound consisting exclusively of a mixture limited to flour, dry powdered ground mustard constituting an oil-active surfactant agent, and a wetting agent, said method comprising the following steps:
  (a) waiting for clear skies and dry weather;
  (b) upon such weather conditions occuring, mixing said flour and ground mustard in a thorough manner, to constitute a dry mixture;
  (c) admixing the wetting agent with the dry mixture, to constitute a paste;
  (d) spreading the paste onto the land surface polluted with oil, with a rake, a shovel or the like, whereby the oil is absorbed and broken down into a crumbly powder;
  (e) collecting the crumbly powder with a rake, a vacuum hose or a shovel;
  (f) loading the collected crumbly powder into a transport vehicle; and
  (g) driving the vehicle to a suitable dump site for unloading the crumbly powder therein.

* * * * *